Dec. 24, 1935.  E. FÉCHOZ  2,025,581
GLASS FURNACE
Filed Nov. 4, 1932
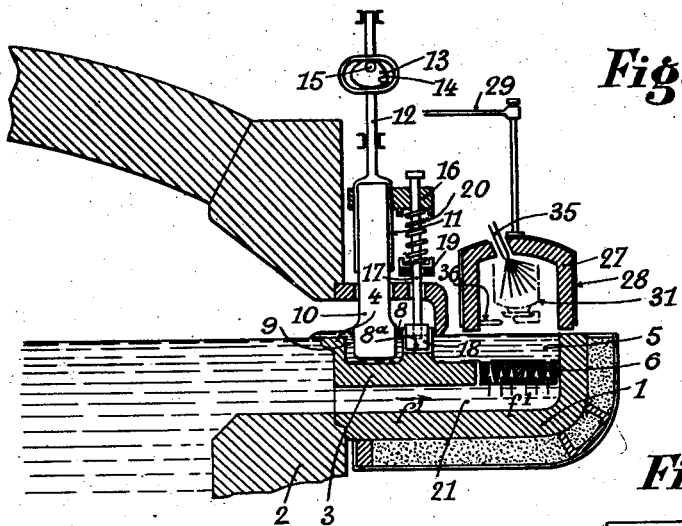
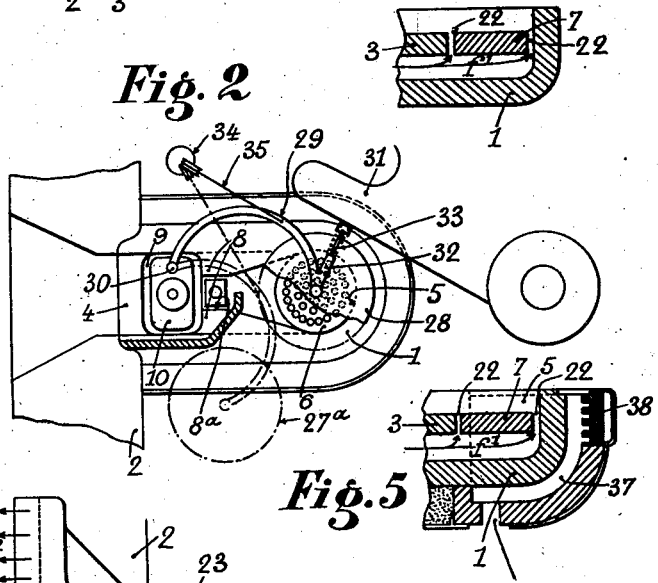
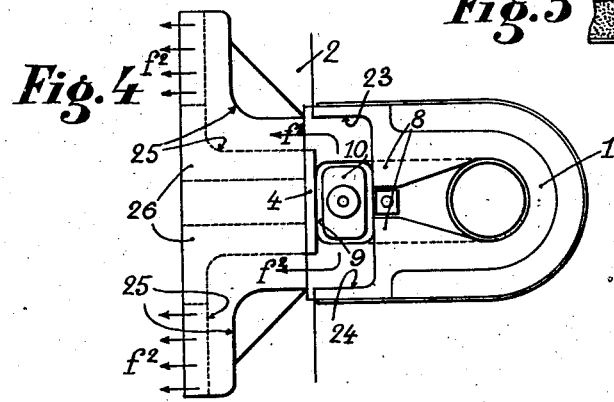
Etienne Féchoz
INVENTOR
his ATTORNEY.

Patented Dec. 24, 1935

2,025,581

UNITED STATES PATENT OFFICE 2,025,581

GLASS FURNACE

Etienne Féchoz, Gilly-sur-Isere, France

Application November 4, 1932, Serial No. 641,153
In France November 17, 1931

4 Claims. (Cl. 49—56)

The present invention relates to improvements in furnaces for the melting of glass, such as basin furnaces, crucible furnaces, and the like, which are adapted to ameliorate the method of manual gathering of the melted glass, and to permit the glass-shaping machines, for instance those employing vacuum suction, to receive a supply of glass having a uniform temperature at all points on a horizontal section.

In conformity to the invention, the furnace comprises a gathering chamber consisting of refractory material and having a certain depth, said chamber being connected in a closed circuit with the recipient containing the molten glass, such as a basin, crucible or the like, the conduit which delivers the glass to the chamber being adapted to connect the bottom of the chamber with a point of said recipient which is situated at a certain distance from the upper level of the glass, whereby the glass delivered to the chamber will be free from bubbles and impurities.

Further characteristics of the invention will be set forth in the following description.

In the accompanying drawing which is given solely by way of example and relates to the case of a basin furnace:

Fig. 1 is a partial vertical and longitudinal section of an improved furnace in conformity to the invention, and Fig. 2 is the corresponding plan view.

Fig. 3 shows a modified detail of Fig. 1.

Fig. 4 is a plan view of a modification of the construction shown in Fig. 2.

Fig. 5 is a partial section of another modification, showing a particular method comprised in the invention.

In the form of construction shown in Figs. 1 and 2, a trough of refractory material 1 is fitted against the wall 2 of a basin furnace, or one having a like trough for molten glass. Due to a horizontal partition 3 and a ridge or sill 4, the basin 5 can only receive glass which is taken out at a certain depth beneath the glass level and is thus free from bubbles and impurities. This refined glass enters the basin through the apertures of a grating 6, as shown in Figs. 1 and 2, or through the annular space between a disc 7 and the walls of the trough 1, as shown in Fig. 3.

At the upper part of the trough 1 are mounted two vertical partitions 4 and 8, which form a cavity 9 together with the lateral walls, and said cavity is connected with the upper part of the well 5 by a channel 8a of rectangular section provided in the partition 8. In the cavity 9 is located a piston 10 which has an alternate vertical motion.

The said piston consists of refractory material and is maintained by a metallic casing 11 which is mounted on the piston and is secured to a rod 12 adapted for mechanical control.

The movement of the piston, at the desired rate, which may for instance depend upon the operation of the machine which withdraws the glass from the gathering chamber 5, may be effected in any suitable manner, for example by means of driving gear controlling a cam 13 mounted in a sliding frame 14 secured to the rod 12. The outline of the cam may be such as to impart to the rod a movement of rise and descent which takes place in a short time as compared with the time of stopping of the piston 10 at the upper dead centre, corresponding to the flow of the glass from the chamber 5 to the cavity 9. On the other hand, the length of the upward and downward stroke may be adjusted by varying the eccentricity of the cam 13 with reference to the driving shaft 15 on which it is mounted. This adjustment of the stroke permits to vary the rate of flow of the glass and also to change the level of the glass in chamber 5 as desired.

Upon the metallic casing 11 is mounted a support 16 for guiding a vertical rod 17 having at its lower end a valve disc 18 of refractory material, adapted to close the conduit 8a in which it is movable. The rod 17 is guided at the lower end by a stationary member 19 which also serves as a lower stop.

By the compression of spring 20 the said valve 18 is preferably maintained in the lowest possible position, and thus the said valve, which serves the same purpose as the suction valve of a pump, will already occupy the lower position when the piston 10 commences its downward stroke.

The operation is as follows. The glass passes from the furnace 2 into chamber 5, through the conduit 21 formed at the bottom of the furnace by the partition 3, and then through the apertures in the grating 6 or through the annular space 22 surrounding the disc 7 (Fig. 3). Thus the molten glass flows in the direction of the arrows $f^1$ through the bottom of the chamber 5.

Whatever be the construction employed, whether the one shown in Fig. 1 or the one shown in Fig. 3, the channels for the flow of the glass through the grating or grid 6 or around the disc 7 are made sufficiently small in order that this passage may constitute the point of greatest resistance in the circuit of the glass.

The circulation of the glass is effected by two combined means, firstly by the natural flow due to the delivery of the glass to the machine, the level in chamber 5 thus descending and tending to be restored due to the principle of communicating vessels, and secondly, due to the pumping effect of the piston 10. By reason of the greater resistance of this passage, the glass is obliged to flow at the same speed through all the orifices of the grating 6 or upon the whole periphery of the disc 7, thus delivering hot glass to all points of the chamber 5, and even to those which are the farthest with respect to the furnace.

In this manner, the temperature of the glass will be uniform at all points of the same horizontal section of the chamber 5.

Due to the connection which is made between the movements of the piston 10 and the valve 18 which has already been lowered and thus closes the channel 8a, when the piston 10 begins to descend, and during this stroke of the piston, the glass which is contained in the cavity 9 and now rises, cannot return (or at least only partially) into the chamber 5. For this reason the glass thus raised is obliged to overflow for the major part into the furnace over the sill 4 whose top is situated at a lower level than the other edges 8 of the cavity 9. The sill 4 is somewhat above the level of the glass in the furnace, and thus the glass which has passed over it will be unable to return to the rear. After this overflow has taken place, the piston 10 rises, thus lowering the level of the glass in the cavity 9, and as the said piston draws with it the valve 18, there will at once take place a natural flow of a small quantity of glass from the chamber 5 to the cavity 9.

If these movements are repeated, a circulation of glass will be set up between the furnace and the chamber by which the glass in the chamber will be constantly maintained in the fluid state, and this circulation will further assure the uniform temperature of the glass employed in the manufacture.

Fig. 4 shows a modification of the device represented in Fig. 2. While in the latter case the glass which is returned back to the furnace by the piston 10 flows directly above the glass which is to be delivered to the machine, in the construction shown in Fig. 4, on the contrary, the sill or ridge 4 has a certain height, and lateral channels 23—24 direct the returning glass to a sufficient distance from the axis of the glass-feeding conduit.

In the present case, this glass flows in grooves or channels formed in the blocks employed for the wall of the basin. Suitable sills 26 oblige the glass to proceed for a certain distance before returning to the basin, as shown by the arrows f² indicated in the return current of glass. The masonry which is situated above the level of the glass is shaped in such manner that it will provide for a direct reverberation from the furnace hearth upon the surface of the glass in circulation in the said channels.

Furthermore, use is made of direct means for heating the upper layer of glass in the chamber 5, during the period when the glass-gathering does not take place. It is advisable, in fact, to heat further the glass either in order to reduce the loss of heat by the radiation of glass exposed to the air, or in the particular case of suction machines, to provide in the first place, for the feeding of glass at a very high temperature for the better formation of the necks of bottles or the like, which are usually thinner at the top than the main body, thus avoiding risk of incision.

In the known arrangements, the means provided for the further heating of this type of front basin consist of stationary burners which furnish heat continuously, at each instant of the operating cycle of the machine, and at a certain distance from the part of this basin which is farthest forward.

In the arrangement according to the invention, on the contrary, the heating means are only applied at the point at which they are required. They are moved aside only during the gathering operation, and at this time, the burner (employing fuel-oil, gas, etc.) is turned down or is even stopped.

In the construction shown in Figs. 1 and 2, the heating means consist of an inverted bell-shaped device 27 which consists of refractory material and is maintained in a metallic casing 28. This latter is supported, for instance, by an arm 29 which is pivotally mounted on a fixed vertical axle pin 30 (Fig. 2). The bell 27, supported by the curved arm 29, is displaced at 27a by the arm 31 of the machine (adapted to withdraw the glass from the chamber 5) when this arm 31 is in the suction position as herein represented. In order to prevent any abrupt motion of an injurious nature, the arm 31 of the machine preferably makes contact with an appendage 32 of the arm 29 supporting the bell, through the medium of a shock-absorbing spring 33. When the arm 30 of the machine leaves the gathering point, the bell 27 returns to the heating position, under the action of a counterweight 34 connected by a cable 35, mounted on pulleys, with the arm 29.

As concerns regularity of temperature, no corrections have been hitherto made of the difference between the most advanced point and the most remote point of the trough, with reference to the furnace.

However, with the bell 27, mounted directly above the end of the front basin, it is possible to render more favourable the condition in the most prominent part of the trough, either by giving a suitable direction to the burner 35 in order to preferably produce a parabolic flame for the purpose of heating principally by radiation, or by providing a small partition 36 (Fig. 1) which brings the heat upon the forward or projecting part.

In the case of heating with a rich purified gas, the apparatus will comprise a great number of small burners, or bricks provided with recesses, for instance of the Krupp system, in such manner as to radiate the heat chiefly upon the most advanced periphery of the trough.

A modified arrangement for heating the most advanced part of the chamber may be employed alone or in combination with the bell 27, as is shown in Fig. 5, and herein, a heating chamber 37 is provided around the forward end of the refractory basin 1, with the further use of radiating brick 38 of the Krupp type, adapted to radiate heat upon the basin 1. The burnt gas is discharged through the orifice 39.

Obviously, the said invention is not limited to the forms of construction herein described and represented, which are given solely by way of example.

Having now described my invention what I claim as new and desire to secure by Letters Patent is:

1. In a glass furnace of the basin, crucible or other type, a continuous closed circuit for the liquid glass to be delivered to the casting machine, comprising a gathering chamber for the molten glass, a channel for supplying glass from the furnace to said gathering chamber and connecting the latter with the furnace at a point situated under the upper level of glass in said furnace, further channel means connecting said gathering chamber with the furnace for the return of glass, a sill terminating said second channel, perforated transversal partition means protruding in said second channel, and forming together with said sill, a pocket, a longitudinally movable plunger located in said pocket, and adapted to displace at least a part of the glass contained therein, obturating means adapted to open and to close said perforated partition means and thereby to establish and to avoid all communication between the glass contained in said pocket and the glass contained in the remaining portion of said second channel, and actuating means for said plunger and obturating means providing for the flow of glass in both of said channels by simultaneously closing said communication between the pocket and the remainder of the second channel, and thus avoiding all return flow of cold glass into the gathering chamber, and causing the plunger to dip into the glass filling said pocket thereby causing said latter cold glass to flow over said sill and to return into the furnace.

2. In a glass furnace of the basin, crucible or other type, a continuous closed circuit for the liquid glass to be delivered to the casting machine, comprising a gathering chamber for the molten glass, a channel for supplying glass from the furnace to said gathering chamber and connecting latter with the furnace at a point situated under the upper level of glass in said furnace, heating means adapted to heat the upper surface of glass in said gathering chamber, said heating means being removable and comprising a member actuated by the gathering device of the machine in order to displace said heating means and further means urging said heating means back into its initial position as soon as the glass has been delivered and said gathering device removed.

3. A glass furnace according to claim 1 further comprising a solid partition terminating said second mentioned channel and disposed preferably at a higher level than the glass level in the gathering chamber.

4. A glass furnace according to claim 1 wherein an operative connection is provided between said plunger and obturator imparting to the plunger first an upward stroke at the end of which it is stopped and then a downward stroke followed by another stop period, and in the meantime causing the obturator to be lifted during the upward stroke and the first stop period of the plunger thereby providing for the filling of said recess, with liquid glass, and then lowering said obturator during the downward stroke of the plunger thereby causing the glass to return into the furnace.

ETIENNE FÉCHOZ.